United States Patent
Hasegawa et al.

(10) Patent No.: US 10,640,096 B2
(45) Date of Patent: May 5, 2020

(54) BRAKE FLUID PRESSURE CONTROL DEVICE FOR VEHICLES WITH BAR HANDLE

(71) Applicant: NISSIN KOGYO CO., LTD., Tomi, Nagano (JP)

(72) Inventors: Tetsuya Hasegawa, Tomi (JP); Yuki Kinoshita, Tomi (JP)

(73) Assignee: NISSIN KOGYO CO., LTD., Nagano (JP)

(*) Notice: Subject to any disclaimer, the term of this patent is extended or adjusted under 35 U.S.C. 154(b) by 109 days.

(21) Appl. No.: 15/919,695

(22) Filed: Mar. 13, 2018

(65) Prior Publication Data

US 2018/0265058 A1   Sep. 20, 2018

(30) Foreign Application Priority Data

Mar. 14, 2017  (JP) .................................. 2017-049128

(51) Int. Cl.
*B60T 8/34* (2006.01)
*B60T 8/50* (2006.01)
(Continued)

(52) U.S. Cl.
CPC ............ *B60T 8/1706* (2013.01); *B60T 8/171* (2013.01); *B60T 8/172* (2013.01); *B60T 8/1766* (2013.01);
(Continued)

(58) Field of Classification Search
CPC ... B60T 8/28; B60T 8/72; B60T 8/171; B60T 8/172; B60T 8/261; B60T 8/1706;
(Continued)

(56) References Cited

U.S. PATENT DOCUMENTS 8,070,237 B2 *  12/2011  Ogawa .................. B60T 8/1706
                                                   303/137
9,002,611 B2 *  4/2015   Giddens ................. B60T 8/306
                                                   180/282
(Continued)

FOREIGN PATENT DOCUMENTS

EP    1842755    10/2007
EP    2907711    8/2015
(Continued)

OTHER PUBLICATIONS

Guenther, Joachim, Machine translation of DE320664, Device for monitoring the slip on wheels of motor vehicles (Year: 1982).*
(Continued)

*Primary Examiner* — Anne Marie Antonucci
*Assistant Examiner* — Sahar Motazedi
(74) *Attorney, Agent, or Firm* — Andrew M. Calderon; Roberts Calderon Safran & Cole, P.C.

(57) ABSTRACT

A brake fluid pressure control device for vehicles with bar handle which is configured to start a holding control of a fluid pressure of a wheel brake according to wheel deceleration calculated based on a wheel speed of the vehicle is provided. In the brake fluid pressure control device, the vehicle includes an acceleration sensor which is configured to detect acceleration in a front-rear direction of the vehicle, acceleration, detected by the acceleration sensor, which occurs in a rearward direction when the vehicle is decelerating is detected as a positive value, and the holding control is started when it is judged that the acceleration detected by the acceleration sensor is larger than or equal to a detection acceleration threshold value and the wheel deceleration is smaller than or equal to a wheel deceleration threshold value.

16 Claims, 9 Drawing Sheets

(51) Int. Cl.
*B60T 8/17* (2006.01)
*B60T 8/171* (2006.01)
*B60T 8/172* (2006.01)
*B60T 8/32* (2006.01)
*B60T 8/72* (2006.01)
*B60T 8/1766* (2006.01)
*B60T 8/26* (2006.01)
*B62L 3/02* (2006.01)
*B60T 7/10* (2006.01)

(52) U.S. Cl.
CPC ............ *B60T 8/261* (2013.01); *B60T 8/3205* (2013.01); *B60T 8/3225* (2013.01); *B60T 8/50* (2013.01); *B60T 8/72* (2013.01); *B60T 7/102* (2013.01); *B60T 2230/06* (2013.01); *B60T 2240/06* (2013.01); *B62L 3/023* (2013.01)

(58) Field of Classification Search
CPC .... B60T 8/1766; B60T 8/3205; B60T 8/3225; B60T 8/4081; B60T 8/50; B60T 8/306; B60T 8/17551; B60T 8/246; B60T 8/74; B60T 2230/03; B60T 2230/06; B60T 2240/06; B60T 7/102; B60T 13/66; B60T 13/686; B60T 2201/16; B62L 3/023
See application file for complete search history.

(56) References Cited

U.S. PATENT DOCUMENTS

| | | | | |
|---|---|---|---|---|
| 9,233,670 | B2* | 1/2016 | Hasegawa | B60T 8/50 |
| 9,561,785 | B2* | 2/2017 | Iizuka | B60T 8/1706 |
| 2002/0022919 | A1* | 2/2002 | Hara | B60T 7/22 |
| | | | | 701/70 |
| 2003/0066720 | A1* | 4/2003 | Sakamoto | B60T 8/1706 |
| | | | | 188/177 |
| 2010/0225158 | A1 | 9/2010 | Ogawa et al. | |
| 2014/0180552 | A1* | 6/2014 | Giddens | B60T 8/306 |
| | | | | 701/70 |
| 2014/0214300 | A1* | 7/2014 | Hasegawa | B60T 8/50 |
| | | | | 701/79 |
| 2014/0379236 | A1* | 12/2014 | Kato | B60T 8/1763 |
| | | | | 701/74 |
| 2015/0232074 | A1* | 8/2015 | Iizuka | B60T 8/172 |
| | | | | 701/34.1 |
| 2016/0009262 | A1* | 1/2016 | Kinoshita | B60T 13/146 |
| | | | | 303/159 |
| 2016/0195568 | A1* | 7/2016 | Grundmann | B60T 8/172 |
| | | | | 73/514.31 |
| 2017/0282875 | A1* | 10/2017 | Wakizaka | B60T 8/17551 |
| 2018/0072286 | A1* | 3/2018 | Hirokami | B60T 8/175 |
| 2018/0244159 | A1* | 8/2018 | Satterthwaite | B60L 7/18 |

FOREIGN PATENT DOCUMENTS

| | | | |
|---|---|---|---|
| JP | 2008037148 | | 2/2008 |
| JP | 2009090774 | A * | 4/2009 |
| JP | 5014159 | | 8/2012 |
| JP | 2014144656 | | 8/2014 |

OTHER PUBLICATIONS

Machine Translation of JP2009090774A (Year: 2009).*
European Search Report for EP application No. 18161721.8-1012 dated Aug. 29, 2018, 7 pages.
Japanese Office Action dated Aug. 6, 2019 for JP application No. 2017049128, 9 pages.

* cited by examiner

BRAKE FLUID PRESSURE CONTROL DEVICE FOR VEHICLES WITH BAR HANDLE

CROSS-REFERENCE TO RELATED APPLICATION

This application claims priority from Japanese Patent Application No. 2017-049128, filed on Mar. 14, 2017, the entire subject matter of which is incorporated herein by reference.

TECHNICAL FIELD

The present invention relates to a brake fluid pressure control device for vehicles with bar handle which controls the fluid pressure of a wheel brake at the time of braking to suppress a rear-wheel lift of a vehicle having a bar handle (hereinafter referred to as a vehicle with bar handle) such as a motorcycle or a motor tricycle.

BACKGROUND

What is called a rear-wheel lift phenomenon (hereinafter referred to as a rear-wheel lift) that the rear wheel lifts up at the time of sudden braking sometimes occurs in vehicles with bar handle. A vehicle running in a rear-wheel lift state is unstable in vehicle behavior. Japanese Patent No. 5014159 discloses a technique for suppressing a rear-wheel lift.

In the technique disclosed in Japanese Patent No. 5014159, if deceleration (negative value) of a vehicle body that is calculated on the basis of vehicle body speeds detected by wheel speed sensors for the front wheel and the rear wheel becomes smaller than a prescribed value (negative value) during braking, the pressure of a front wheel cylinder is lowered and kept at a lowered pressure (paragraphs 0024 and 0028 and FIGS. 3(B) and 4 of Japanese Patent No. 5014159).

What is called a wheelie state in which the front wheel lifts up during acceleration occurs in vehicles with bar handle. A vehicle running in a wheelie state is also unstable in vehicle behavior.

In Japanese Patent No. 5014159, the probability of occurrence of a rear-wheel lift is judged on the basis of vehicle body acceleration that is calculated from detection values (a front wheel speed and a rear wheel speed) of the wheel speed sensors for the front wheel and the rear wheel.

However, if the probability of occurrence of a rear-wheel lift is judged only on the basis of vehicle body acceleration that is calculated from detection values (a front wheel speed and a rear wheel speed) of the wheel speed sensors for the front wheel and the rear wheel, and a control of lowering the fluid pressure of a wheel brake is started, the fluid pressure control is not always started with proper timing.

SUMMARY

The present invention has been made in view of the above problem, and an object of the invention is therefore to provide a brake fluid pressure control device for vehicles with bar handle capable of suppressing a rear-wheel lift properly by reducing a variation of the start timing of a fluid pressure control for suppressing a rear-wheel lift.

According to an aspect of the invention, there is provided a brake fluid pressure control device for vehicles with bar handle which is configured to start a holding control of a fluid pressure of a wheel brake according to wheel deceleration calculated based on a wheel speed of the vehicle, wherein the vehicle includes an acceleration sensor which is configured to detect acceleration in a front-rear direction of the vehicle, acceleration, detected by the acceleration sensor, which occurs in a rearward direction when the vehicle is decelerating is detected as a positive value, and the holding control is started when it is judged that the acceleration detected by the acceleration sensor is larger than or equal to a detection acceleration threshold value and the wheel deceleration is smaller than or equal to a wheel deceleration threshold value.

DETAILED DESCRIPTION (Configuration)

Figure 1:
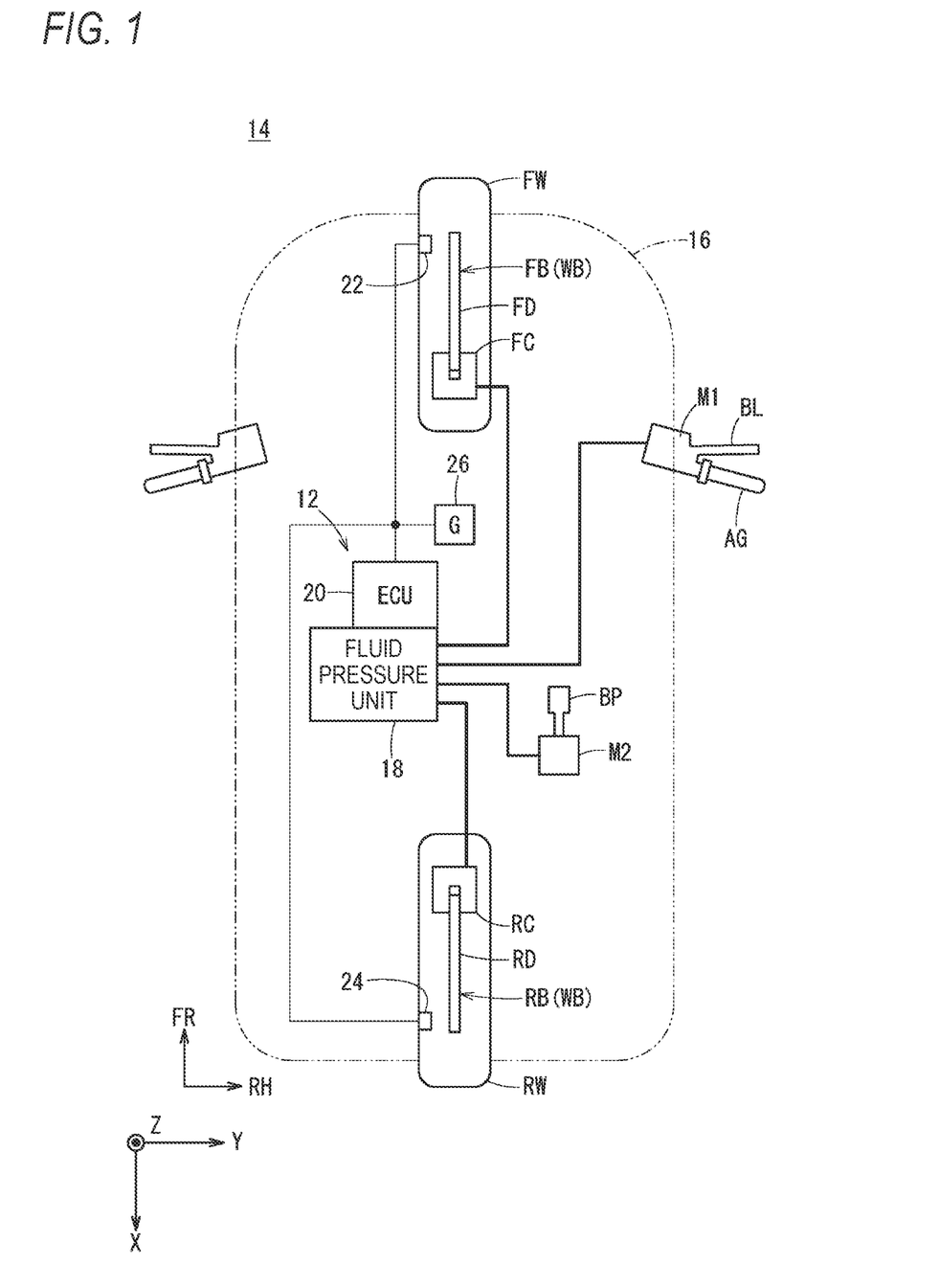
FIG. 1 shows a rough configuration of a brake fluid pressure control device for vehicles with bar handle according to an embodiment that incorporates a fluid pressure control start timing control device.

FIG. 1 is a schematic plan view of a vehicle with bar handle 14 (may be abbreviated as a "vehicle 14") such as a motorcycle and shows a rough configuration of a brake fluid pressure control device for vehicles with bar handle (also referred to as a "brake fluid pressure control device") 12 according to an embodiment that is installed in the vehicle 14. As described later, the brake fluid pressure control device 12 incorporates a fluid pressure control start timing control device 10.

The arrows X, Y, and Z shown in FIG. 1 and following figures indicate the X axis, Y axis, and Z axis which represent the front-rear direction, left-right direction, and vertical direction of a vehicle 14, respectively. And the arrows FR, RH, and UP shown in FIG. 1 and following figures indicate the forward direction (parallel with the X axis), the rightward direction (parallel with the Y axis), and the upward direction (parallel with the Z axis) of the vehicle 14, respectively.

The vehicle 14 is equipped with a front wheel FW and a rear wheel RW which are suspended on suspensions of a vehicle body 16.

The brake fluid pressure control device 12 is mainly equipped with a fluid pressure unit 18 having fluid passages (flow passages of a brake fluid) and various components and an ECU (electronic control unit) 20 which is a control device for controlling the various components of the fluid pressure unit 18 as appropriate. In FIG. 1, fluid passages are drawn by thick solid lines and electric wires are drawn by thin solid lines.

The front wheel FW is provided with a front wheel brake FB and the rear wheel RW is provided with a rear wheel brake RB. The front wheel brake FB and the rear wheel brake RB are together referred to as wheel brakes WB (FB, RB). The front wheel brake FB is composed of a brake disc FD and brake calipers (also referred to as front wheel calipers or calipers) FC, and the rear wheel brake RB is composed of a brake disc RD and brake calipers (also referred to as rear wheel calipers or calipers) RC.

A brake lever BL for activating the front wheel brake FB is provided with a front wheel master cylinder M1, and a brake pedal BP for activating the rear wheel brake RB is provided with a rear wheel master cylinder M2.

The brake lever BL and the brake pedal BP are manipulated by a rider. In the vehicle 14, the magnitude of rotational drive power of a drive source (engine, motor, or the like; not shown) is adjusted by a manipulation on an accelerator grip AG performed by the rider.

Electrically connected to the ECU 20 are a front wheel speed sensor 22 for detecting a wheel speed of the front wheel FW (front wheel speed) Vf and a rear wheel speed sensor 24 for detecting a wheel speed of the rear wheel RW (rear wheel speed) Vr and an acceleration sensor (also referred to as a G sensor, a 3-axis acceleration sensor, or a 3-axis G sensor) 26 for detecting acceleration values of the vehicle 14 in the three orthogonal axes X, Y, and Z.

Figure 2:
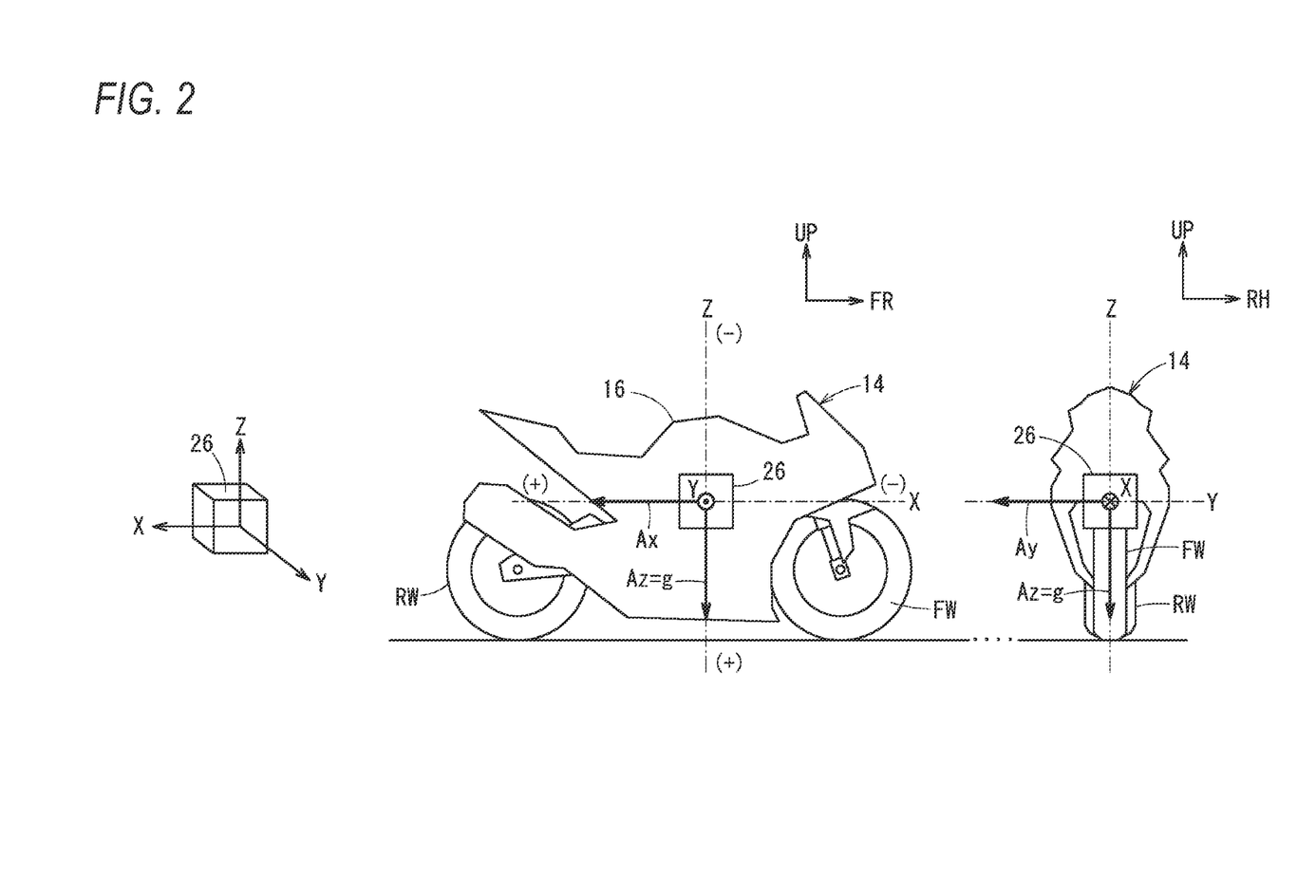
FIG. 2 illustrates how an acceleration sensor is installed in a vehicle.

As shown in FIG. 2, the acceleration sensor 26 is attached to the vehicle body 16 at, for example, its center-of-gravity position and detects acceleration (X-axis acceleration) Ax in the X-axis direction (front-rear direction), acceleration (Y-axis acceleration) Ay in the Y-axis direction (left-right direction), and acceleration (Z-axis acceleration) Az in the Z-axis direction (vertical direction) of the vehicle 14.

As for the signs of acceleration values Ax, Ay, and Az detected by the acceleration sensor 26 being attached to the vehicle body 16, the directions indicated by arrows in the middle part and the right part of FIG. 2 are positive directions.

More specifically, acceleration Ax directed rearward relative to the vehicle 14 is positive and acceleration Ax directed forward relative to the vehicle 14 is negative.

Acceleration Ay directed leftward relative to the vehicle 14 in a front view is positive and acceleration Ay directed rightward relative to the vehicle 14 in a front view is negative.

Acceleration Az directed downward relative to the vehicle 14 is positive and acceleration Az directed upward relative to the vehicle 14 is negative.

The acceleration of gravity g is detected as +1 G (Az=1 G=g) in the Z-axis direction. In the left part of FIG. 2, the acceleration sensor 26 is drawn in perspective so that the three orthogonal axes (X, Y, and Z axes) can be recognized visually.

An installation position, the origin of the three orthogonal coordinate axes, and inclinations with respect to the horizontal direction and the vertical direction can be set in a desired manner. Where they are set in a desired manner, an appropriate measure to take is to correct detection values for them using known offset values (refer to paragraph 0034 and FIG. 5 of Japanese Patent No. 5887284, for example).

(Brake Fluid Pressure Passage)

Figure 3:
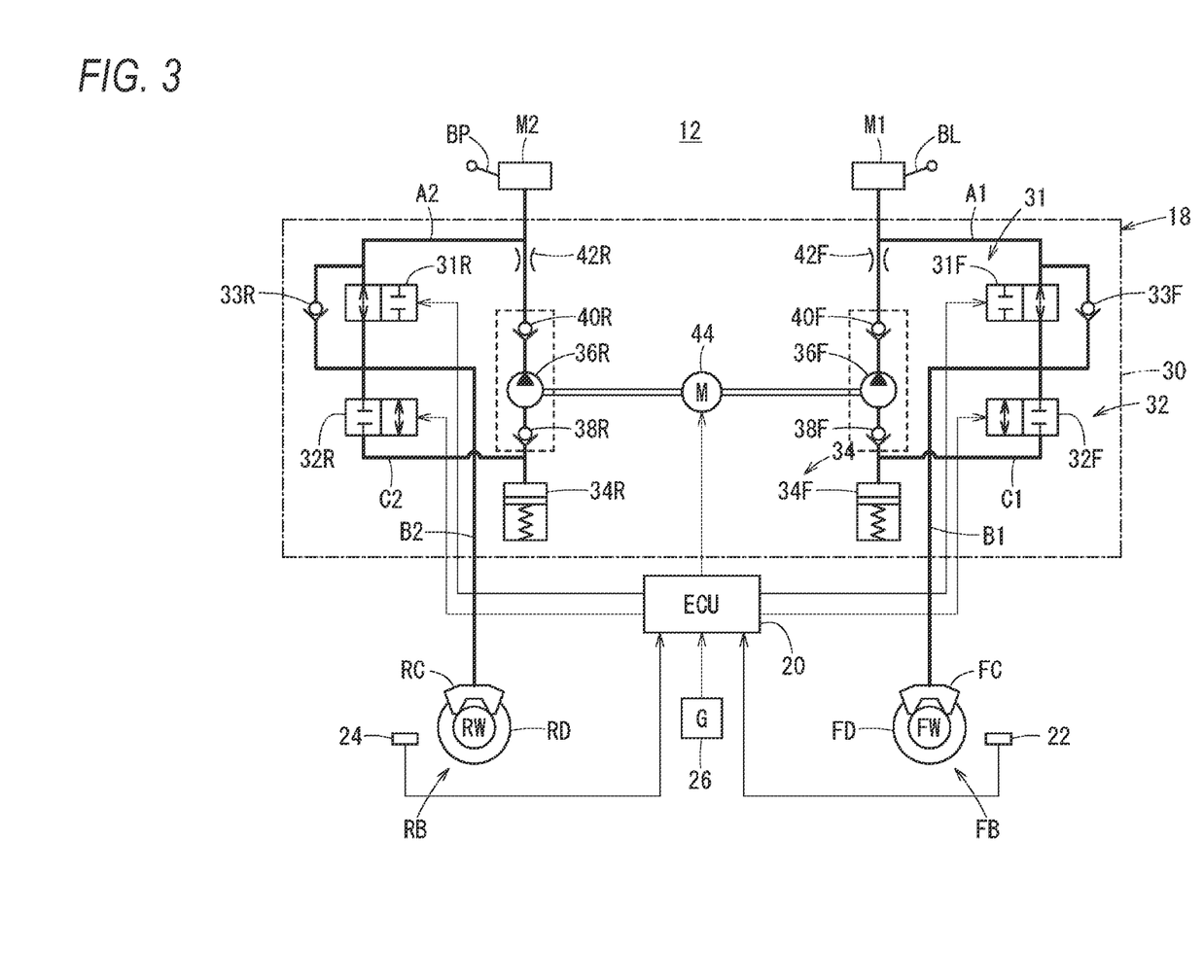
FIG. 3 shows a brake fluid pressure passage of the brake fluid pressure control device for vehicles with bar handle.

FIG. 3 shows a brake fluid pressure passage of the brake fluid pressure control device 12. In FIG. 3, fluid passages are drawn by thick solid lines and electric wires are drawn by thin solid lines. The double line represents a shaft.

Referring to FIG. 3, the ECU 20, which is equipped with a CPU, a RAM, a ROM, and an input/output circuit, performs a fluid pressure control by performing various kinds of computation according to input signals from the acceleration sensor 26 and wheel speed sensors 22 and 24 and programs and data stored in the ROM.

The front wheel calipers FC are a fluid pressure device for converting a brake fluid pressure generated by the front wheel master cylinder M1 and the brake fluid pressure control device 12 into an actuation force for the front wheel brake FB provided for the front wheel FW.

The rear wheel calipers RC are a fluid pressure device for converting a brake fluid pressure generated by the rear wheel master cylinder M2 and the brake fluid pressure control device 12 into an actuation force for the rear wheel brake RB provided for the rear wheel RW.

The front wheel calipers FC and the rear wheel calipers RC are connected to the fluid pressure unit 18 by respective pipes.

(Fluid Pressure Unit 18 of Brake Fluid Pressure Control Device 12)

As shown in FIG. 3, the fluid pressure unit 18 of the brake fluid pressure control device 12 is disposed between the front wheel master cylinder M1 and the front wheel brake FB and between the rear wheel master cylinder M2 and the rear wheel brake RB.

The fluid pressure unit 18 includes a body 30 which is a base body having fluid passages through which a brake fluid is to flow, plural input valves 31 (31F, 31R) and plural output valves 32 (32F, 32R) which are disposed in the fluid passages formed in the body 30, and other things.

The front wheel master cylinder M1 is connected to the front wheel calipers FC via a front wheel master cylinder M1-side fluid passage A1 and a wheel-side fluid passage B1 which are formed in the body 30.

The rear wheel master cylinder M2 is connected to the rear wheel calipers RC via a rear wheel master cylinder M2-side fluid passage A2 and a wheel-side fluid passage B2 which are formed in the body 30.

The fluid passage A1 which is connected to the front wheel master cylinder M1 communicates with the front wheel calipers FC via an input valve 31F and the fluid passage B1 in an ABS non-activated state in which an ABS (antilock braking system) control is not started.

The front wheel master cylinder M1 generates a brake fluid pressure corresponding to a force that the rider applies to the brake lever BL. In an ABS non-activated state, a force applied to the brake lever BL is transmitted to the front wheel brake FB in the form of that brake fluid pressure.

Likewise, the fluid passage A2 which is connected to the rear wheel master cylinder M2 communicates with the rear wheel calipers RC via an input valve 31R and the fluid passage B2 in an ABS non-activated state in which an ABS control is not started.

The rear wheel master cylinder M2 generates a brake fluid pressure corresponding to a force that the rider applies to the brake pedal BP. In an ABS non-activated state, a force applied to the brake pedal BP is transmitted to the rear wheel brake RB in the form of that brake fluid pressure.

In the body 30, an output valve 32F and a check valve 33F, in addition to the input valve 31F, are disposed on the fluid passages A1 and B1 which connect the front wheel master cylinder M1 and the front wheel calipers FC.

In the body 30, an output valve 32R and a check valve 33R, in addition to the input valve 31R, are disposed on the fluid passages A2 and B2 which connect the rear wheel master cylinder M2 and the rear wheel calipers RC.

Furthermore, in the body 30, a reservoir 34F, a pump 36F, a suction valve 38F, a discharge valve 40F, and an orifice 42F are provided so as to correspond to the front wheel master cylinder M1.

In the body 30, a reservoir 34R, a pump 36R, a suction valve 38R, a discharge valve 40R, and an orifice 42R are provided so as to correspond to the rear wheel master cylinder M2.

The fluid pressure unit 18 is equipped with a motor 44 for driving the two pumps 36 (36F, 36R). The rotary shaft of the motor 44 drives the pumps 36F and 36R.

The input valves 31F and 31R, which are normally-open electromagnetic valves, are disposed between the front wheel master cylinder M1 and the front wheel calipers FC (i.e., between the fluid passages A1 and B1) and between the rear wheel master cylinder M2 and the rear wheel calipers RC (i.e., between the fluid passages A2 and B2), respectively.

In an ABS non-activated state, each of the input valves 31F and 31R is open and thereby allows transmission of a brake fluid pressure from the front wheel master cylinder M1 to the front wheel calipers FC or from the rear wheel master cylinder M2 to the rear wheel calipers RC.

In an ABS-activated state, each of the input valves 31F and 31R is closed by the ECU 20 when the front wheel FW or the rear wheel RW is nearly locked, thus interrupting transmission of a fluid pressure from the brake lever BL (front wheel master cylinder M1) to the front wheel brake FB or from the brake pedal BP (rear wheel master cylinder M2) to the rear wheel brake RB.

The output valves 32F and 32R, which are normally-closed electromagnetic valves, are disposed between the front wheel calipers FC and the reservoir 34F (i.e., on the fluid passage (open passage) C1) and between the rear wheel calipers RC and the reservoir 34R (i.e., on the fluid passage (open passage) C2), respectively.

The output valves 32F and 32R are closed in an ABS non-activated state. In an ABS-activated state, each of the output valves 32F and 32R is opened by the ECU 20 when the front wheel FW or the rear wheel RW is nearly locked, thus allowing part of a brake fluid pressure to escape to the reservoir 34F or 34R instead of being applied to the front wheel brake FB or the rear wheel brake RB (pressure reduction control). In a state that an ABS control is being made and the output valves 32F and 32R are closed, if the input valve 31F or 31R is closed by the ECU 20 when the front wheel FW or the rear wheel RW is nearly locked, a brake fluid pressure being applied to the front wheel brake FB or the rear wheel brake RB is maintained (holding control).

The check valves 33F and 33R are connected in parallel to the respective input valves 31F and 31R. Each of the check valves 33F and 33R is a valve that allows only inflow of a brake fluid from the front wheel calipers FC to the front wheel master cylinder M1 or from the rear wheel calipers RC to the rear wheel master cylinder M2. Also in a state that the input valve 31F or 31R is closed after cancellation of an input from the brake lever BL or the brake pedal BP, the check valve 33F or 33R allows inflow of the front wheel calipers FC to the front wheel master cylinder M1 or from the rear wheel calipers RC to the rear wheel master cylinder M2.

The reservoirs 34 (34F, 34R) have a function of storing escape brake fluids when the output valves 32 (32F, 32R) are opened, respectively.

Equipped with the suction valve 38F or 38R and the discharge valve 40F or 40R (enclosed by a broken-line frame in FIG. 3), each of the pumps 36F and 36R has a function of sucking a brake fluid stored in the upstream reservoir 34F or 34R and returning (discharges) it to the downstream front wheel master cylinder M1 or rear wheel master cylinder M2.

That is, the suction valves 38F and 38R are valves for allowing only inflow (suction) of brake fluids to the upstream sides from the reservoirs 34F and 34R to the pumps 36F and 36R, respectively.

On the other hand, the discharge valves 40F and 40R are valves for allowing only outflow (discharge) of brake fluids from the sides downstream of the pumps 36F and 36R to the master cylinders M1 and M2, respectively.

A ripple component of a brake fluid being discharged to the master cylinder M1 or M2 via the discharge valve 40F or 40R is absorbed by the orifice 42R or 42R.

(Basic Operation of Brake Fluid Pressure Control Device 12)

A basic operation of the brake fluid pressure control device 12 will be described below. Since the basic operation of the brake fluid pressure control device 12 is the same as that of known brake fluid pressure control devices of the same kind, it will not be described below in detail but outlined.

When the brake lever BL and the brake pedal BP are manipulated to cause braking, a brake fluid having a fluid pressure corresponding to the manipulation on the brake lever BL is supplied from the front wheel master cylinder M1 to the cylinder of the front wheel calipers FC through the fluid pressure unit 18, whereby a braking force is given to the front wheel brake FB. At the same time, a brake fluid having a fluid pressure corresponding to the manipulation on the brake pedal BP is supplied from the rear wheel master cylinder M2 to the cylinder of the rear wheel calipers RC through the fluid pressure unit 18, whereby a braking force is given to the rear wheel brake RB. In this case, the fluid passages A1 and B1 communicate with each other and hence are at the same pressure and the fluid passages A2 and B2 communicate with each other and hence are at the same pressure.

If the ECU 20 judges, on the basis of a vehicle body speed Vv and slip ratios of the front wheel FW and the rear wheel RW, that a fluid pressure control such as an ABS control is necessary and also judges that, for example, the brake fluid pressures should be lowered, the output valves 32F and 32R are opened being energized by the ECU 20 and the input valves 31F and 31R are closed being energized by the ECU 20, whereupon a pressure reduction control (fluid pressure control) is started.

As a result, brake fluids are discharged from the calipers FC and RC to the reservoirs 34F and 34R via the output valves 32F and 32R and fluid passages C1 and C2, whereby the fluid pressures of the fluid passages B1 and B2, that is, the pressures of the calipers FC and RC (calipers pressures), are lowered. A fluid pressure control mode in which the calipers pressures are being lowered in this manner is referred to as a "pressure lowering mode."

Since the ECU 20 drives the motor 44 at the same time as energizes the output valves 32F and 32R, stored brake fluids are returned from the reservoirs 34F and 34R to the master cylinders M1 and M2.

If judging that current brake fluid pressures should be maintained, the ECU 20 closes the output valves 32F and 32R by deenergizing them. As a result, the fluid passages B1 and B2 on the side of the wheel brakes FB and RB are made not to communicate with the fluid passages A1 and A2 or C1 and C2, whereby the pressures of the calipers FC and RC (calipers pressures) are kept constant. A fluid pressure control mode in which the calipers pressures are kept constant is referred to as a "holding mode."

If judging that the fluid pressures should be elevated, the ECU 20 closes the output valves 32F and 32R by deenergizing them and adjusts the opening times of the input valves 31F and 31R by a duty control, whereby the calipers pressures are elevated gradually. A fluid pressure control mode in which the calipers pressures are being elevated is referred to as a "pressure elevation mode."

Fluid pressure controls of the above-described pressure lowering mode, holding mode, and pressure elevation mode are performed while selection is made between them as appropriate until it is judged that none of fluid pressure controls such as an ABS control are necessary.

(Fluid Pressure Control Start Timing Control Device 10)

Figure 4:
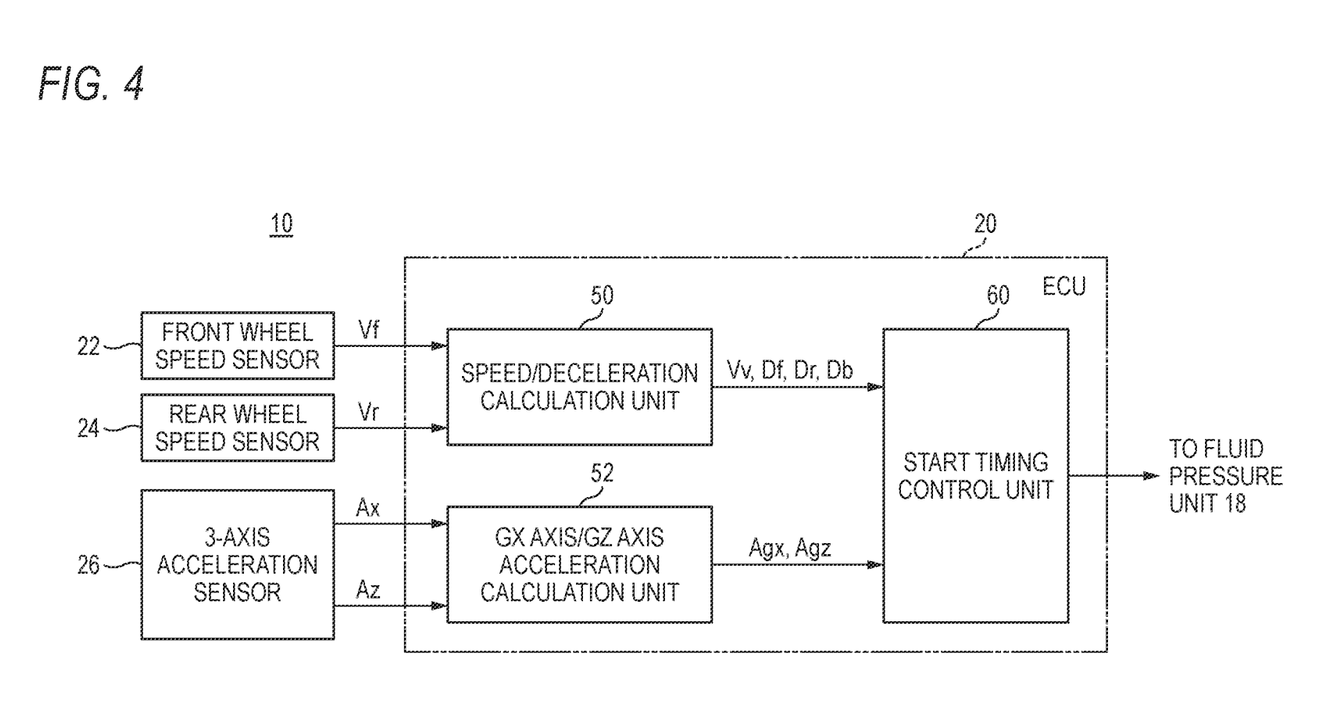
FIG. 4 is a block diagram showing the configuration of an essential part of the brake fluid pressure control device for vehicles with bar handle including the fluid pressure control start timing control device.

FIG. 4 shows the configuration of an essential part of the brake fluid pressure control device for a bar handle vehicle 12 including the fluid pressure control start timing control device 10.

As shown in FIG. 4, the fluid pressure control start timing control device 10 is composed of the ECU 20 and the front wheel speed sensor 22, the rear wheel speed sensor 24, and the 3-axis acceleration sensor 26 which are connected to the ECU 20.

The ECU 20 is composed of a start timing control unit 60 and a speed/deceleration calculation unit 50 and a GX axis/GZ axis acceleration calculation unit 52 which are connected to the start timing control unit 60.

The GZ axis and the GX axis which relate to a calculation performed by the GX axis/GZ axis acceleration calculation unit 52 will now be described with reference to FIG. 5. The GZ axis is the axis in a rear-wheel lift direction (also referred to as the "axis in a rear-wheel lift prediction direction"), and the GX axis is the axis that is perpendicular to the GZ axis in the vertical plane (XZ plane) that is the center plane of the vehicle body 16.

Figure 5:
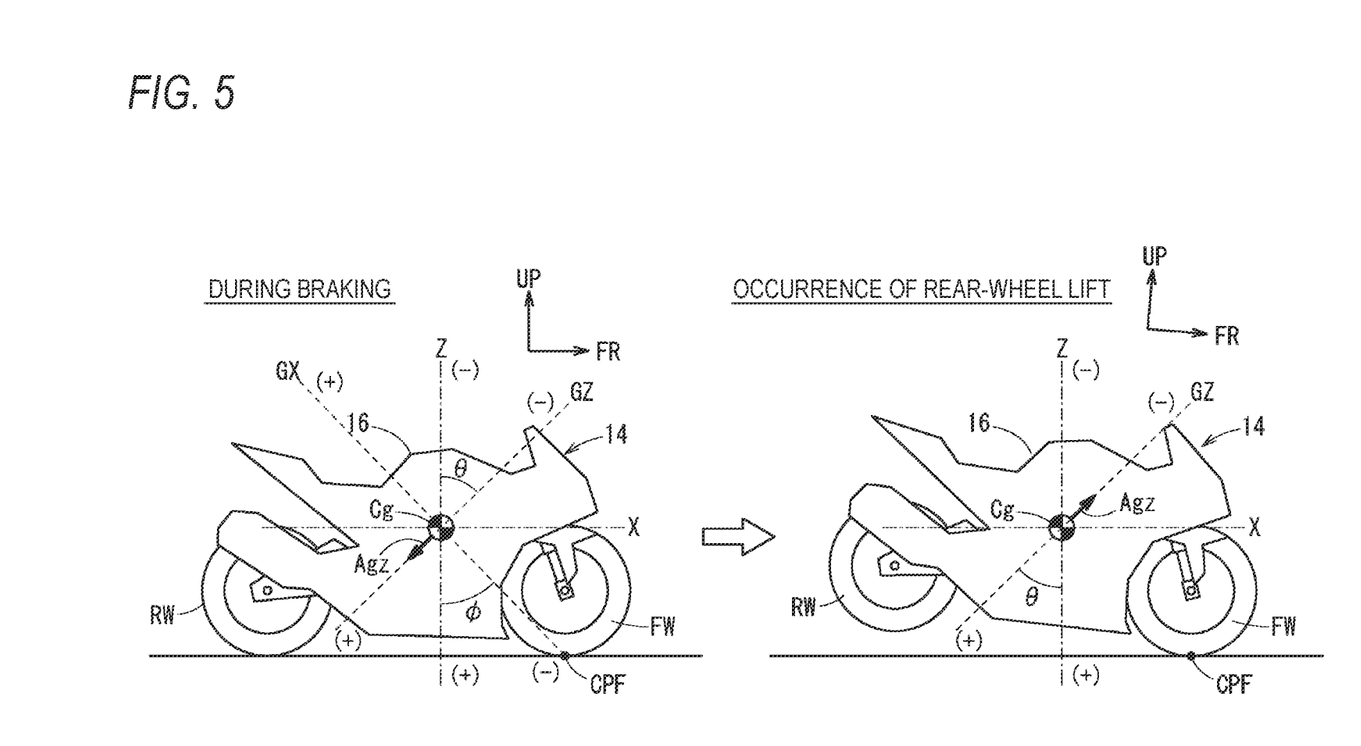
FIG. 5 illustrates an axis in a rear-wheel lift direction.

The left part of FIG. 5 shows a state of a running vehicle 14 that has started to decelerate and is under braking without a rear-wheel lift. In this state, the GX axis in the XZ plane (vertical plane) means the axis (represented by a straight broken line) that connects the center of gravity Cg of the vehicle 14 and a point CPF where the front wheel FW is in contact with the ground and that becomes a rotation center if a rear-wheel lift occurs in this state. The angle formed by the GX axis that coincides with the above straight line and the Z axis (vertical axis) is represented by $\phi$ (known calculated value).

The GZ axis is the axis that is perpendicular to the GX axis in the XZ plane. On the GZ axis, the directions extending obliquely downward and upward from the center of gravity Cg are defined as a positive direction and a negative direction, respectively.

As described later in describing a manner of calculation in detail, acceleration Agz on the GZ axis under braking without a rear-wheel lift is in the positive direction (directed obliquely downward) as shown in the left part of FIG. 5. And acceleration Agz on the GZ axis under braking with a rear-wheel lift (also referred to as "rear-wheel lift axis acceleration") is in the negative direction (directed obliquely upward) as shown in the right part of FIG. 5. Correctly, when the vehicle 14 is inclined forward by a rear-wheel lift and the X axis, the Z axis, the GZ axis are inclined accordingly, the angle $\theta$ that is formed by the Z axis and the GZ axis (i.e., $90°(\pi/2)-\phi$; known value) in the left part of FIG. 5 becomes different from that in the right part of FIG. 5. However, practically, there are no problems even if it is considered that the angle $\theta$ is not changed by a rear-wheel lift. Thus, for the sake of convenience, such a change in angle $\theta$ is not reflected in the right part of FIG. 5. The criterion for judging occurrence of a rear-wheel lift is that the acceleration Agz on the GZ axis changes from a positive value to 0 G.

Returning to FIG. 4, the speed/deceleration calculation unit 50 calculates a vehicle body speed Vv, front wheel deceleration Df, and rear wheel deceleration Dr on the basis of a front wheel speed Vf that is output from the front wheel speed sensor 22 and a rear wheel speed Vr that is output from the rear wheel speed sensor 24 according to the following Equations (1) to (3), respectively:

$$Vv=(Vf+Vr)/2 \tag{1}$$

$$Df=\{Vf(\text{current front wheel speed})-Vf(\text{front wheel speed of a very short time } \Delta t \text{ ago})\}/\Delta t \tag{2}$$

$$Dr=\{Vr(\text{current rear wheel speed})-Vr(\text{rear wheel speed of a very short time } \Delta t \text{ ago})\}/\Delta t \tag{3}$$

The GX axis/GZ axis acceleration calculation unit 52 calculates GX-axis acceleration Agx and GZ-axis acceleration Agz on the basis of X-axis acceleration Ax and Z-axis acceleration Az that are output from the 3-axis acceleration sensor 26 according to the following Equations (4) and (5), respectively:

$$Agx=Ax(GX)=Ax \cos \theta \tag{4}$$

$$Agz=Az(GZ)-Ax(GZ)=Az \cos \theta - Ax \sin \theta. \tag{5}$$

In Equations (4) and (5), Ax(GX) is the GX-axis component of the X-axis acceleration Ax, Az(GX) is the GX-axis component of the Z-axis acceleration (i.e., acceleration of gravity) Az, Az(GZ) is the GZ-axis component of the Z-axis acceleration (i.e., acceleration of gravity) Az, and Ax(GZ) is the GZ-axis component of the X-axis acceleration Ax.

Figure 6:
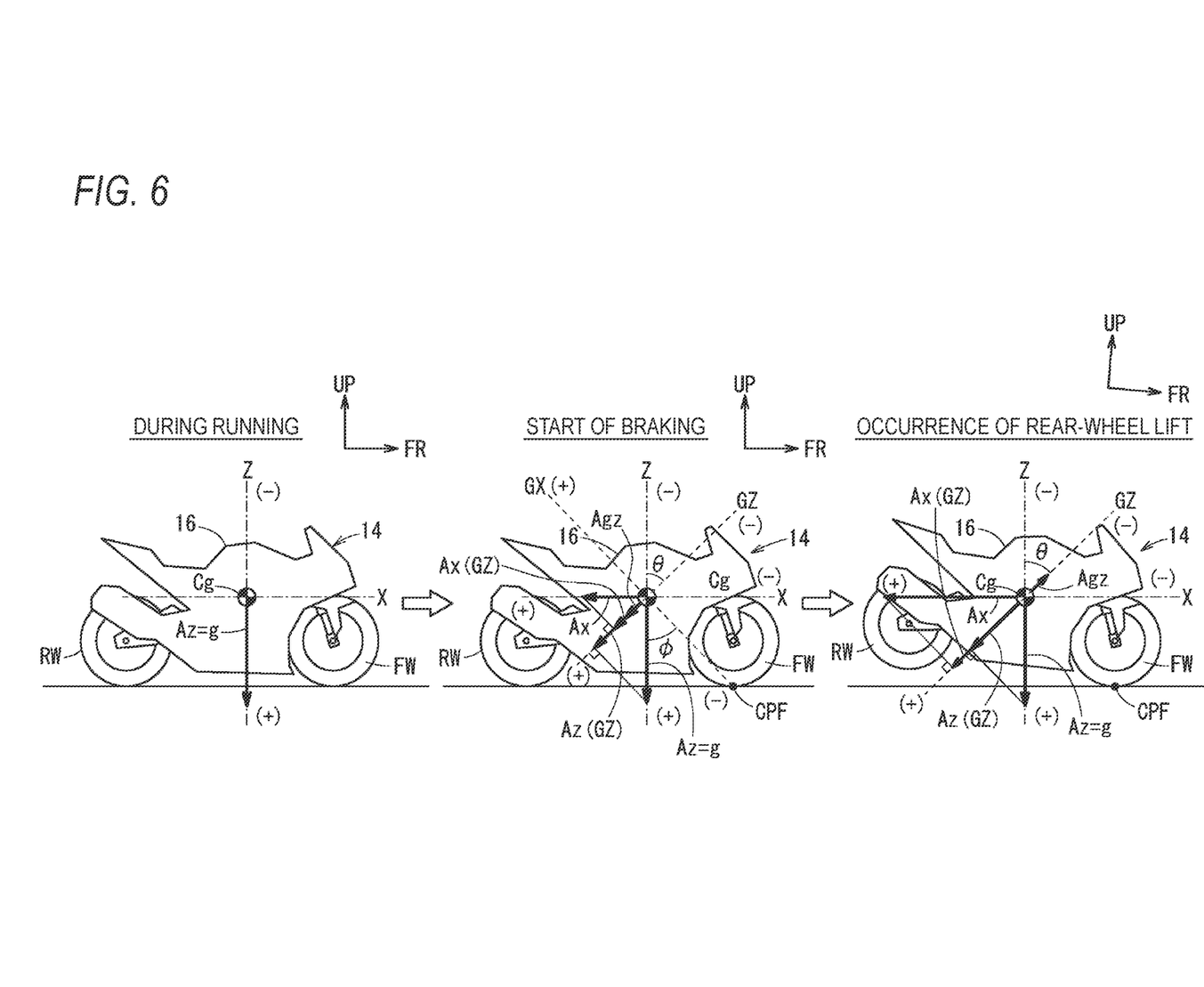
FIG. 6 is vector diagrams illustrating acceleration occurring in the axis in the rear-wheel lift direction.

As shown in the left vector diagram of FIG. 6, the acceleration Az acting on the center of gravity Cg of the vehicle 14 that is running at a constant speed is only the acceleration of gravity g that is directed downward in the Z axis (vertical direction) (i.e., Az=g).

That is, as long as the 3-axis acceleration sensor 26 is operating normally, the Z-axis acceleration Az and the X-axis acceleration Ax of the vehicle 14 that is running at a constant speed are detected to be g and 0, respectively.

After a start of braking on the vehicle 14 by a manipulation on the brake lever BL by the rider, as shown in the middle vector diagram of FIG. 6, X-axis acceleration Ax occurs and is detected by the 3-axis acceleration sensor 26 whereas the Z-axis acceleration Az remains equal to g.

Thus, as seen from the middle vector diagram of FIG. 6, the GX-axis component Ax(GX) of X-axis acceleration Ax, the GX-axis component Az(GX) of Z-axis acceleration (i.e., acceleration of gravity) Az, GX-axis acceleration Agx, the GZ-axis component Az(GZ) of Z-axis acceleration (i.e., acceleration of gravity) Az, the GZ-axis component Ax(GZ) of X-axis acceleration Ax, and GZ-axis acceleration Agz are calculated on the basis of X-axis acceleration Ax and Z-axis acceleration Az detected by the 3-axis acceleration sensor 26 according to the above Equations (4) and (5).

As shown in the right vector diagram of FIG. 6, a rear-wheel lift occurs when the GZ-axis acceleration Agz is in the negative direction and does not occur when the GZ-axis acceleration Agz is in the positive direction.

Returning to FIG. 4, as described below, the start timing control unit 60 judges whether to start a holding control on the fluid pressure unit 18 on the basis of the vehicle body speed Vv, the front wheel deceleration Df, and the rear wheel deceleration Dr that are acquired from the speed/deceleration calculation unit 50 and the GX-axis acceleration Agx and the GZ-axis acceleration Agz that are acquired from the GX axis/GZ axis acceleration calculation unit 52 and, if necessary, performs a drive control on the fluid pressure unit 18.

(Operation of Fluid Pressure Control Start Timing Control Device 10)

Figure 7:
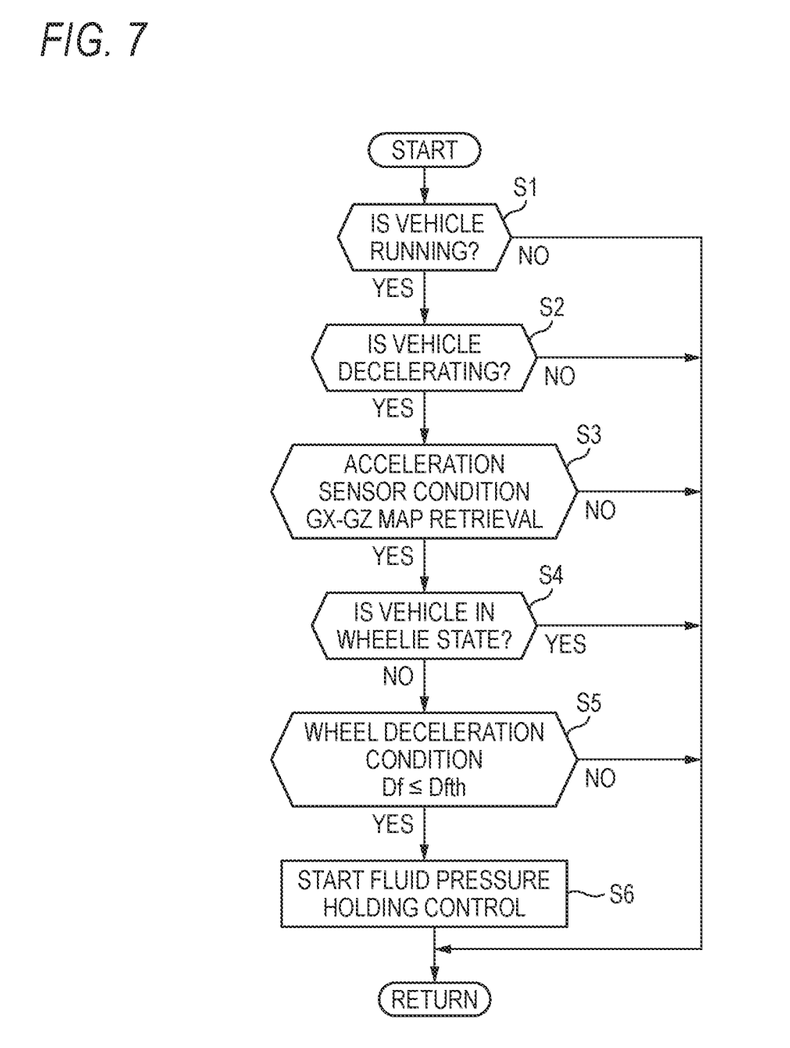
FIG. 7 is a flowchart for description of a process that is executed by the fluid pressure control start timing control device of the brake fluid pressure control device for vehicles with bar handle according to the embodiment.

Next, the operation of the fluid pressure control start timing control device 10 which is a part of the brake fluid pressure control device 12 according to the embodiment will be described with reference to a flowchart of FIG. 7. The process of this flowchart is executed by the CPU of the ECU 20. This process is executed repeatedly every short time Δt that is on the order of milliseconds.

At step S1, the ECU 20, which also functions as a judging means for judging whether the vehicle 14 is running or stopped, judges whether the vehicle 14 is running or stopped.

More specifically, the ECU 20 calculates a vehicle body speed Vv according to Equation (1) on the basis of a front wheel speed Vf detected by the front wheel speed sensor 22 and a rear wheel speed Vr detected by the rear wheel speed sensor 24. The ECU 20 judges that the vehicle 14 is running if the calculated vehicle body speed Vv is higher than or equal to a predetermined speed threshold value Vth at which the vehicle 14 is regarded as approximately stopped, and judges that the vehicle 14 is not running if the calculated vehicle body speed Vv is lower than the speed threshold value Vth.

Alternatively, the ECU 20 may judge whether the vehicle 14 is running or stopped not on the basis of a vehicle body speed Vv but on the basis of one of a front wheel speed Vf detected by the front wheel speed sensor 22 or a rear wheel speed Vr detected by the rear wheel speed sensor 24.

If judging that Vv<Vth and hence the vehicle 14 is not running (S1: no), the ECU 20 finishes the process of this time and returns to step S1.

On the other hand, if judging that the vehicle 14 is running (S1: yes), the ECU 20 judges at step S2 whether the vehicle 14 is decelerating by judging whether estimated vehicle body deceleration Db calculated according to the following Equation (6) is negative (Db<0).

$$Db=\{Vv(\text{current vehicle body speed})-Vv(\text{vehicle body speed of a very short time } \Delta t \text{ ago})\}/\Delta t \quad (6)$$

The estimated vehicle body deceleration Db is calculated by the speed/deceleration calculation unit 50.

Figure 8:
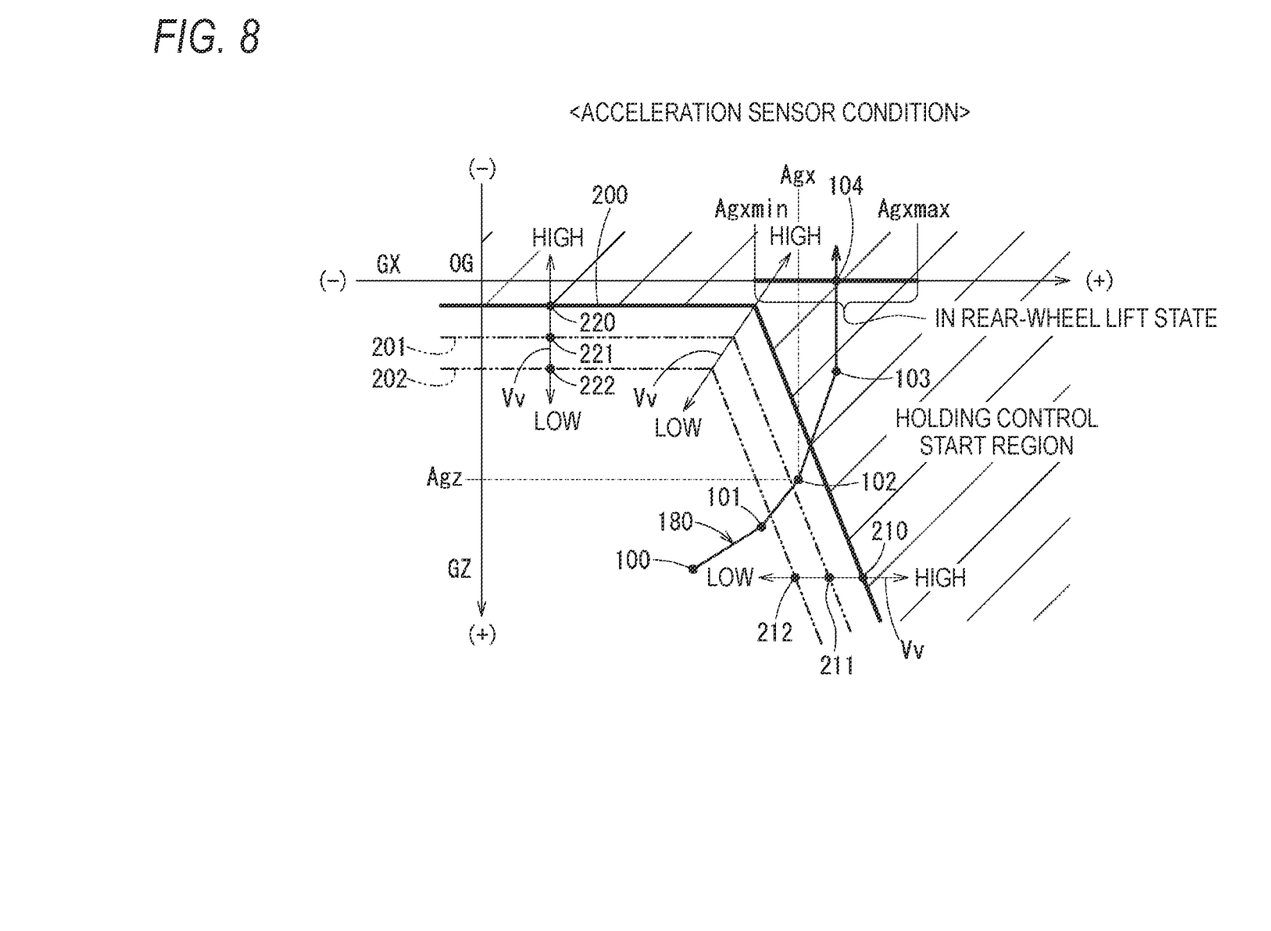
FIG. 8 illustrates an acceleration sensor condition.

At step S3, the ECU 20 plots, on the coordinate plane shown in FIG. 8 that is defined by the GX axis (horizontal axis) and the GZ axis (vertical axis), a combination of GX-axis acceleration Agx and GZ-axis acceleration Agz that are calculated by the GX axis/GZ axis acceleration calculation unit 52 according to the above Equations (4) and (5) on the basis of an X-axis acceleration signal Ax and a Z-axis acceleration signal Az that are output from the acceleration sensor 26 (acceleration Ax that occurs in the rearward direction when the vehicle 14 is decelerating is regarded as positive). Then the ECU 20 judges whether the plotted point is within a holding control start region. In the coordinate plane shown in FIG. 8, the vertical GZ axis is positive under the horizontal line passing through the origin and negative over the same line.

Detection acceleration threshold value maps (also referred to as "GX-GZ maps") 200, 201, and 202 each of which indicates the boundary of a holding control start region (hatched) can be determined by an actual measurement or a simulation using the vehicle body speed Vv as a parameter.

Each of the maps 200, 201, and 202 is set approximately in such a manner that the GZ-axis acceleration Agz (threshold value) has a fixed value when the GX-axis acceleration Agx varies from 0 G to a prescribed value and that the GZ-axis acceleration Agz (threshold value) increases in proportion to the GX-axis acceleration Agx as the latter increases after passing the prescribed value so that a transition to a holding operation can be made with early timing.

The maps 200, 201, and 202 are selected when the vehicle body speed Vv is high, in a medium range, and low, respectively.

In a curve 180 on the coordinate plane shown in FIG. 8, point 100 (Agx, Agz) corresponds to a state that the vehicle 14 is running at a constant speed and braking has not been started yet. As the point moves along the curve 180 passing point 101 (Agx, Agz) and point 102 (Agx, Agz) (braking is being made), the GZ-axis acceleration Agz (positive) decreases gradually and the GX-axis acceleration Agx (positive) increases gradually. Point 101 (Agx, Agz) and point 102 (Agx, Agz) are out of the holding control start region (hatched in FIG. 8) and hence it is judged that there is no probability of occurrence of a rear-wheel lift.

Around point 103(Agx, Agz) (braking is being made), the GZ-axis acceleration Agz (positive) comes close to 0 G quickly and the GX-axis acceleration Agx (positive) is being saturated. Point 103 is in the holding control start region (hatched in FIG. 8) where it is judged that occurrence of a rear-wheel lift is highly probable (i.e., the detection acceleration threshold value map 200 has been passed).

When the map 200 is determined actually, it is founded that a rear-wheel lift occurred at point 104 (Agx, Agz) and that, starting from point 104 (Agx, Agz), the point (Agx, Agz) is kept on a thick solid line shown in FIG. 8 in which the GZ-axis acceleration Agz is kept approximately equal to 0 G and the GX-axis acceleration Agx ranged from a rear-wheel lift minimum GX-axis acceleration value Agxmin to a rear-wheel lift maximum GX-axis acceleration value Agxmax. In other words, it is found that during the rear-wheel lift the point (Agx, Agz) is kept between the coordinates (Agxmin, approximately 0)) and (Agxmax, approximately 0)). In the maps 200, 201, and 202, the rear-wheel lift minimum Gx-axis acceleration Agxmin and the rear-wheel lift maximum Gx-axis acceleration Agxmax shift toward the small Gx-axis acceleration side as the vehicle body speed Vv decreases.

If judging at step S3 that the point (Agx, Agz) is within the holding control start region (hatched in FIG. 8) (S3: yes), the ECU 20 judges at step S4 whether the vehicle 14 is running in a wheelie state that may be caused by a sudden acceleration manipulation on the accelerator grip AG (see FIG. 1). Taking into consideration that a wheelie state is a running state that the front wheel FW as a steering wheel is lifted up and the vehicle 14 is running using only the rear wheel RW which is a drive wheel, whether the vehicle 14 is running in a wheelie state can be judged on the basis of, for example, a temporal variation of the deviation of differences between the front wheel speed Vf and the rear wheel speed Vr.

If judging that the vehicle 14 is not running in a wheelie state (S4: no), the ECU 20 judges at step S5 whether the front wheel deceleration Df (negative value) is smaller than or equal to a front wheel deceleration threshold value Dfth (negative value), that is, whether Inequality Df≤Dfth (wheel deceleration condition) is satisfied.

Figure 9:
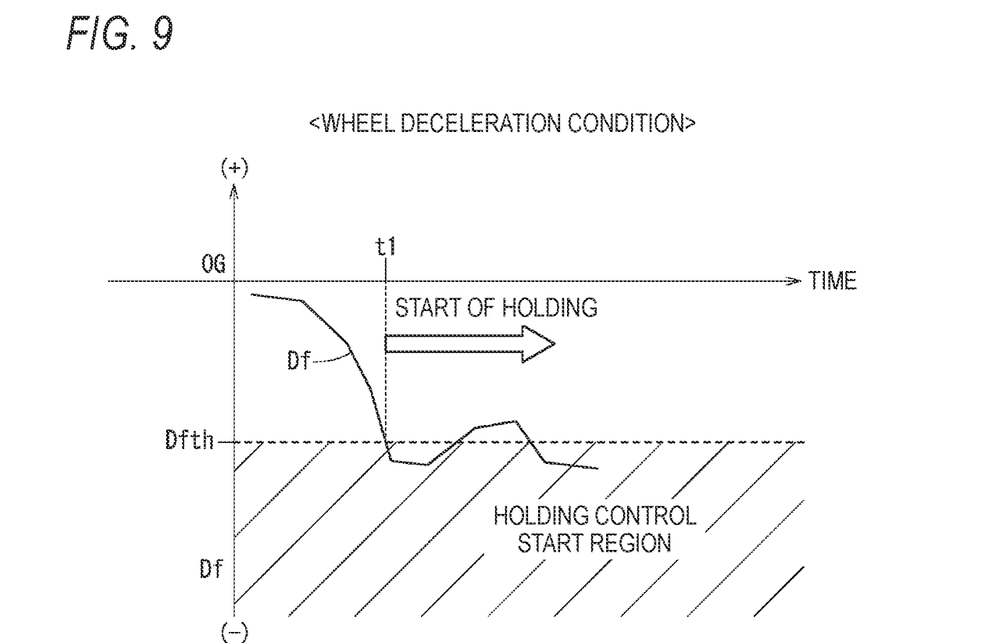
FIG. 9 illustrates a wheel deceleration condition.

The threshold value (below which a rear-wheel lift may occur) for the front wheel deceleration Df, that is, the front wheel deceleration threshold value Dfth, can be determined in advance by using a real vehicle or by a simulation for each vehicle 14 (see FIG. 9).

The wheel deceleration condition may be replaced by a condition that uses the rear wheel deceleration Dr instead of the front wheel deceleration Df.

At step S6, a fluid pressure holding control on the fluid pressure unit 18 is started at an instant when all of the three conditions, that is, the acceleration sensor condition of step S3 (the coordinate point of the GX-axis acceleration Agx and the GZ-axis acceleration Agz is within the holding control start region), the condition of step S4 (the vehicle 14 is not in a wheelie state), and the condition of step S5 (wheel deceleration condition Df≤Dfth), are satisfied simultaneously.

If at least one of the three conditions is not satisfied (S3: no, S4: yes, or S5: no), the process returns to step S1.

The detection acceleration threshold value maps 200, 201, and 202 have, as the arguments, the GX-axis acceleration Agx and the GZ-axis acceleration Agz. Alternatively, where the acceleration sensor 26 is such as to detect, as a positive value, acceleration that occurs in the rearward direction when the vehicle 14 is decelerating and to detect acceleration only in the front-rear direction, only a detection acceleration threshold value Axth for acceleration Ax may be determined in advance.

As described above, in the control according to the above-described process, it is judged that the probability of occurrence of a rear-wheel lift is high and a fluid pressure holding control on the fluid pressure unit 18 is started at step S6 at an instant when all of the three conditions, that is, the condition of step S3 (acceleration sensor condition (the coordinate point of the GX-axis acceleration Agx and the GZ-axis acceleration Agz is within the holding control start region that is bounded by the GX-GZ map 200, 201, or 202)), the condition of step S4 (the vehicle 14 is not in a wheelie state), and the condition of step S5 (wheel deceleration condition (the front wheel deceleration Df is smaller than or equal to the front wheel deceleration threshold value Dfth)), are satisfied simultaneously. As a result, a judgment as to whether to start a holding control can be made easily so as to be suitable for the type of a vehicle with bar handle 14.

(Rear-Wheel Lift Suppressing Operation of Fluid Pressure Control Device 12)

The right part of FIG. 6 shows a state that a rear-wheel lift has occurred. As described above, GZ-axis acceleration Agz calculated according to the above Equation (5) has a negative value (Agz≤0 G).

A point determined by GX-axis acceleration Agx and GZ-axis acceleration Agz that are calculated by the GX axis/GZ axis acceleration calculation unit 52 according to Equations (4) and (5) on the basis of X-axis acceleration Ax and Z-axis acceleration Az that are detected by the acceleration sensor 26 when the vehicle 14 is being decelerated, that is, the brake lever BL and the brake pedal BP, for example, are being manipulated, (input valves 31: open, output valves 32: closed), is plotted on the coordinate plane shown in FIG. 8. If the plotted point is within the holding control start region, the vehicle 14 is not in a wheelie state, and front wheel deceleration Df is smaller than or equal to the front wheel deceleration threshold value Dfth (Df≤Dfth), the input valve 31F on the front wheel FW side is closed by the ECU 20 at time t1, for example (see FIG. 9), whereby a control for holding the pressure acting on the front wheel calipers FC (front wheel calipers pressure) is started.

As a result, the absolute value of the acceleration Ax in the X-axis direction is decreased, whereby the absolute value of the GZ-axis component Ax(GZ) of the acceleration Ax is decreased and the GZ-axis acceleration Agz turns positive (see the middle part of FIG. 6). The rear-wheel lift is thus suppressed.

(Summary)

Basically, the above-described brake fluid pressure control device 12 according to the embodiment is a device for starting a control for holding the fluid pressures of the wheel brakes WB (in the embodiment, the fluid pressure of the front wheel brake FB for the front wheel FW) according to acceleration (actually, deceleration) of the wheel speed of the vehicle 14, for example, the wheel speed Vf obtained by the front wheel speed sensor 22, that is, front wheel deceleration Df.

The vehicle 14 is equipped with the acceleration sensor 26 for detecting acceleration Ax in the X-axis direction which is the front-rear direction of the vehicle 14.

The acceleration sensor 26 is such as to detect, as a positive value, acceleration that occurs in the rearward direction when the vehicle 14 is decelerating, and a holding control is started if it is judged that acceleration Ax detected by the acceleration sensor 26 is larger than or equal to a detection acceleration threshold value Axth (which means quick deceleration) and the wheel deceleration Df is smaller than or equal to the wheel deceleration threshold value Dfth (which also means quick deceleration).

In the embodiment, in addition to wheel deceleration values Df and Dr obtained from wheel speeds Vf and Vr, acceleration Ax that is detected directly by the acceleration sensor 26 provided in the vehicle 14 is used for judgment as to whether to start a holding control. As a result, a variation of the control start judgment timing can be suppressed and, in particular, the ability to suppress a rear-wheel lift can be kept high. Should a detection value of the acceleration sensor 26 be not a proper value, occurrence of an erroneous judgment as to a start of a holding control can be suppressed because judgment as to whether to start a holding control is made also using wheel deceleration values Df and Dr. A judgment that detection values of the acceleration sensor 26 are improper can be made if, for example, X-axis acceleration values detected during a constant-speed ride are out of an allowable range or Z-axis acceleration values detected during a constant-speed ride are out of an allowable range of the acceleration of gravity g.

The detection acceleration threshold value for judging a deceleration state of the vehicle 14 on the basis of front-rear acceleration Ax detected by the acceleration sensor 26 assumes a map (has a characteristic) in which the threshold value for the front-rear acceleration Ax becomes larger as the vehicle body speed Vv increases. This is understood by referring to the positional relationships between intersecting points 210, 211, and 212 of the three straight lines, going downward as the position goes rightward, of the maps 200, 201, and 202 shown in FIG. 8 and a both-sides-arrowed horizontal straight line representing the vehicle body speed Vv (it is judged whether the acceleration Ax detected by the acceleration sensor 26 is within the holding control start region that is bounded by the line of the detection acceleration threshold value Axth).

This measure makes it possible to easily set proper holding control start judgment timing according to the vehicle body speed Vv of the vehicle 14. That is, the holding control start judgment timing can be set later as the vehicle body speed Vv increases.

In the above-described embodiment, the acceleration sensor 26 detects, in addition to acceleration Ax in the front-rear direction, acceleration in the vertical direction of the vehicle 14 in such a manner as to detect, as a positive value, acceleration that occurs downward in the vertical direction. The detection acceleration threshold value is mapped using the acceleration Agx in the straight direction connecting the center of gravity and a contact point of the front wheel and the ground at the time of occurrence of a rear-wheel lift and the acceleration Agz in the rear-wheel lift prediction direction perpendicular to the straight direction in a vertical plane, the acceleration Agx and the acceleration Agz being calculated on the basis of the acceleration Ax in the front-rear direction and the acceleration Az in the vertical direction.

By setting, in advance, the map 200 etc. of detection acceleration threshold values, a judgment as to whether to start a holding control can be made easily so as to be suitable for the type of a vehicle with bar handle 14.

As shown in FIG. 8, the plural maps 200, 201, and 202 are provided for respective vehicle body speeds Vv of the vehicle 14 in such a manner that the acceleration Agx in the straight direction increases and the acceleration Agz in the rear-wheel lift prediction direction decreases as the vehicle body speed Vv becomes higher. This is understood by referring to their positional relationships with an oblique straight line indicating the vehicle body speed Vv.

The detection acceleration threshold value curves assume maps (have characteristics) in which the acceleration Agz (threshold value) becomes smaller as the vehicle body speed Vv increases. This is understood by referring to the positional relationships between intersecting points 220, 221, and 222 of the three horizontal straight lines of the maps 200, 201, and 202 shown in FIG. 8 and a both-sides-arrowed vertical straight line representing the vehicle body speed Vv (it is judged whether the acceleration Agz on the GZ axis detected by the acceleration sensor 26 is within the holding control start region that is bounded by the detection acceleration threshold value Axth).

The map 200 represents a characteristic in which the acceleration Agz on the GZ axis is closest to 0 G, the map 202 represents a characteristic in which the acceleration Agz on the GZ axis is most distant from 0 G, and the map 201 represents a characteristic in which the acceleration Agz on the GZ axis has halfway values between the values of the map 200 and the values of the map 202. The number of maps is not limited to three.

With this measure, a judgment as to whether to start a holding control can be made easily so as to be suitable for the type of a vehicle with bar handle 14. Furthermore, since the acceleration Agx (threshold value) in the straight direction connecting the front wheel contact point CPF and the center of gravity Cg increases and the acceleration Agz (threshold value) in the rear-wheel lift prediction direction decreases as the vehicle body speed Vv becomes higher, the start of a holding control can be delayed when the vehicle body speed Vv is high, whereby the behavior of the vehicle body can be made gentler.

Furthermore, whether the vehicle 14 is in a wheelie state is judged at step S4, and a holding control is started at step S6 if it is judged that the vehicle 14 is not in a wheelie state (S4: no). This makes it possible to prevent an event that an erroneous judgment starts a holding control.

The invention is not limited to the above embodiment; it goes without saying that the invention can be implemented in various manners based on the disclosure of the specification.

According to an aspect of the invention, there is provided a brake fluid pressure control device for vehicles with bar handle which is configured to start a holding control of a fluid pressure of a wheel brake according to wheel deceleration calculated based on a wheel speed of the vehicle, wherein the vehicle includes an acceleration sensor which is configured to detect acceleration in a front-rear direction of the vehicle, acceleration, detected by the acceleration sensor, which occurs in a rearward direction when the vehicle is decelerating is detected as a positive value, and the holding control is started when it is judged that the acceleration detected by the acceleration sensor is larger than or equal to a detection acceleration threshold value and the wheel deceleration is smaller than or equal to a wheel deceleration threshold value.

In the invention, in addition to wheel deceleration values that are determined on the basis of wheel speeds, acceleration that is detected directly by the acceleration sensor provided in the vehicle with bar handle is used for judgment as to whether to start a holding control. As a result, a variation of the control start judgment timing can be suppressed, a rear-wheel lift can be suppressed with proper timing, and the ability to suppress a rear-wheel lift can be kept high. Should a detection value of the acceleration sensor be not a proper value, occurrence of an erroneous judgment as to a start of a holding control can be suppressed because judgment as to whether to start a holding control is made also using the wheel deceleration values.

The detection acceleration threshold value may be mapped so as to have a larger value as a vehicle body speed of the vehicle increases.

By referring to the map, proper holding control start judgment timing can be set according to the vehicle body speed. That is, the holding control start judgment timing can be set later as the vehicle body speed increases.

The acceleration sensor may be configured to detect acceleration in a vertical direction of the vehicle, and acceleration, detected by the acceleration sensor, which occurs downward in the vertical direction is detected as a positive value, and the detection acceleration threshold value may be mapped using acceleration in a straight direction connecting a center of gravity and a contact point of a front wheel and a ground at a time of occurrence of a rear-wheel lift and acceleration in a rear-wheel lift direction perpendicular to the straight direction in a vertical plane, which are calculated based on the acceleration in the front-rear direction and the acceleration in the vertical direction.

By setting, in advance, the map of the detection acceleration threshold value, a judgment as to whether to start a holding control can be made easily so as to be suitable for the type of a vehicle with bar handle.

A plurality of maps each of which indicates the detection acceleration threshold value may be provided according to a vehicle body speed of the vehicle, and set in such a manner that, as the vehicle body speed increases, the acceleration in the straight direction increases and the acceleration in the rear-wheel lift direction decreases.

In this case, a judgment as to whether to start a holding control can be made easily so as to be suitable for the type of a vehicle with bar handle. Furthermore, since the acceleration (threshold value) in the straight direction connecting the front wheel contact point and the center of gravity increases and the acceleration (threshold value) in the rear-wheel lift prediction direction decreases as the vehicle body speed increases, the start of a holding control can be delayed when the vehicle body speed is high, whereby the behavior of the vehicle body can be made gentler.

Whether the vehicle is in a wheelie state may be judged, and the holding control may be started when it is judged that the vehicle is not in the wheelie state.

In this case, it is possible to prevent an event that an erroneous judgment starts a holding control.

What is claimed is:

1. A brake fluid pressure control device for vehicles with bar handle which is configured to start a holding control of a fluid pressure of a wheel brake according to a wheel deceleration calculated based on a wheel speed of the vehicle, wherein
the vehicle includes an acceleration sensor which is configured to detect an acceleration in a front-rear direction of the vehicle,
the acceleration, detected by the acceleration sensor, which occurs in a rearward direction when the vehicle is decelerating is detected as a positive value, and
the holding control is started when it is judged that the acceleration detected by the acceleration sensor is larger than or equal to a detection acceleration threshold value and the wheel deceleration is smaller than or equal to a wheel deceleration threshold value.

2. The brake fluid pressure control device according to claim 1, wherein
the detection acceleration threshold value is mapped so as to have a larger value as a vehicle body speed of the vehicle increases.

3. The brake fluid pressure control device according to claim 1, wherein
the acceleration sensor is configured to detect an acceleration in a vertical direction of the vehicle, and the acceleration in the vertical direction, detected by the acceleration sensor, which occurs downward in the vertical direction is detected as a positive value, and
the detection acceleration threshold value is mapped using an acceleration in a straight direction connecting a center of gravity and a contact point of a front wheel and a ground at a time of occurrence of a rear-wheel lift and an acceleration in a rear-wheel lift direction perpendicular to the straight direction in a vertical plane, which are calculated based on the acceleration in the front-rear direction and the acceleration in the vertical direction.

4. The brake fluid pressure control device according to claim 3, wherein
a plurality of maps each of which indicates the detection acceleration threshold value are provided according to a vehicle body speed of the vehicle, and set in such a manner that, as the vehicle body speed increases, the acceleration in the straight direction increases and the acceleration in the rear-wheel lift direction decreases.

5. The brake fluid pressure control device according to claim 1, wherein
whether the vehicle is in a wheelie state is judged, and the holding control is started when it is judged that the vehicle is not in the wheelie state.

6. The brake fluid pressure control device according to claim 1, further comprising a start timing control unit which judges whether to start the holding control on a basis of a vehicle body speed, a front wheel deceleration, and a rear wheel deceleration, a GX-axis acceleration and a GZ-axis acceleration.

7. The brake fluid pressure control device according to claim 1, wherein the acceleration sensor detects Ax acceleration in a X-axis front-rear direction, Ay acceleration in a Y-axis direction, and Az acceleration in a Z-axis vertical direction of the vehicle.

8. The brake fluid pressure control device according to claim 7, further comprising a fluid pressure control start timing control device composed of an electronic control unit (ECU), and a front wheel speed sensor, a rear wheel speed sensor, and the acceleration sensor which are connected to the ECU, wherein
the ECU is composed of a start timing control unit, and a speed/deceleration calculation unit and a GX axis/GZ axis acceleration calculation unit which are connected to the start timing control unit,
a GZ axis and a GX axis relate to a calculation performed by the GX axis/GZ axis acceleration calculation unit,
the GZ axis is an axis in a rear-wheel lift direction, and
the GX axis is an axis perpendicular to the GZ axis in a vertical plane that is a center plane of the vehicle.

9. The brake fluid pressure control device according to claim 8, wherein
the speed/deceleration calculation unit calculates a vehicle body speed, front wheel deceleration, and rear wheel deceleration on a basis of a front wheel speed that is output from the front wheel speed sensor and a rear wheel speed that is output from the rear wheel speed sensor according to equations (1) to (3), respectively:

$$Vv=(Vf+Vr)/2 \quad (1),$$

$$Df=\{Vf(\text{current front wheel speed})-Vf(\text{front wheel speed of a time } \Delta t \text{ ago})\}/\Delta t \quad (2), \text{ and}$$

$$Dr=\{Vr(\text{current rear wheel speed})-Vr(\text{rear wheel speed of the time } \Delta t \text{ ago})\}/\Delta t \quad (3),$$

wherein:
Vv is the vehicle body speed,
Vf is the front wheel speed,
Vr is the rear wheel speed,
Df is the front wheel deceleration, and
Dr is the rear wheel deceleration.

10. The brake fluid pressure control device according to claim 9, wherein
the GX axis/GZ axis acceleration calculation unit calculates GX-axis acceleration and GZ-axis acceleration on the basis of the Ax acceleration and the Az acceleration according to equations (4) and (5), respectively:

$$Agx=Ax(GX)=Ax \cos \theta \quad (4), \text{ and}$$

$$Agz=Az(GZ)-Ax(GZ)=Az \cos \theta - Ax \sin \theta \quad (5),$$

wherein:
Agx is the GX-axis acceleration,
Agz is the GZ-axis acceleration,
Ax(GX) is the GX-axis component of the Ax acceleration,
Az(GX) is the GX-axis component of the Az acceleration,
Az(GZ) is the GZ-axis component of the Az acceleration, and
Ax(GZ) is the GZ-axis component of the Ax acceleration.

11. The brake fluid pressure control device according to claim 10, wherein
the start timing control unit judges whether to start the holding control on a basis of the vehicle body speed, the front wheel deceleration, and the rear wheel deceleration, the GX-axis acceleration and the GZ-axis acceleration.

12. The brake fluid pressure control device according to claim 11, wherein the ECU judges that the vehicle is running when the vehicle body speed is higher than or equal to a predetermined speed threshold value at which the vehicle is regarded as approximately stopped, and judges that the vehicle is not running when the calculated vehicle body speed is lower than the speed threshold value, and when the vehicle is running, the ECU judges whether the vehicle is decelerating by judging whether an estimated vehicle body deceleration calculated according to Equation (6) is negative (Db<0), $$Db = Vv(\text{current vehicle body speed}) - Vv(\text{vehicle body speed of the time } \Delta t \text{ ago})/\Delta t \quad (6)$$

where Db is the estimated vehicle body deceleration.

13. The brake fluid pressure control device according to claim 12, wherein the ECU plots on a coordinate plane defined by the GX axis and the GZ axis, a combination of the GX-axis acceleration and the GZ-axis acceleration according to equations (4) and (5) on a basis of the Ax acceleration and the Az acceleration, and the GZ-axis acceleration has a fixed value when the GX-axis acceleration varies from 0 G to a prescribed value and the GZ-axis acceleration increases in proportion to the GX-axis acceleration as the latter increases after passing the prescribed value so that a transition to a holding operation can be made with early timing.

14. The brake fluid pressure control device according to claim 13, wherein the ECU judges whether the vehicle is running in a wheelie state that may be caused by a temporal variation of deviation of differences between the front wheel speed and the rear wheel speed, when the vehicle is not running in the wheelie state, the ECU judges whether the front wheel deceleration is smaller than or equal to a front wheel deceleration threshold value, and the holding control is started at an instant when all of the following conditions are satisfied simultaneously: a coordinate point of the GX-axis acceleration and the GZ-axis acceleration is within a holding control start region, the vehicle is not in the wheelie state, and the front wheel deceleration≤the front wheel deceleration threshold value.

15. The brake fluid pressure control device according to claim 1, wherein the holding control is started at an instant when all of the following conditions are satisfied simultaneously: a coordinate point of a GX-axis acceleration and a GZ-axis acceleration is within a holding control start region of a predefined map, the vehicle is not in a wheelie state, and front wheel deceleration≤a front wheel deceleration threshold value.

16. The brake fluid pressure control device according to claim 15, wherein a GZ axis is an axis in a rear-wheel lift direction, and a GX axis is an axis perpendicular to the GZ axis in a vertical plane that is a center plane of the vehicle.

* * * * *